US010254763B2

(12) United States Patent
Tatourian et al.

(10) Patent No.: US 10,254,763 B2
(45) Date of Patent: Apr. 9, 2019

(54) DETECTION OF TRAFFIC DYNAMICS AND ROAD CHANGES IN AUTONOMOUS DRIVING

(71) Applicant: Intel Corporation, Santa Clara, CA (US)

(72) Inventors: Igor Tatourian, Fountain Hills, AZ (US); Justyna Zander, Cupertino, CA (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 15/394,177

(22) Filed: Dec. 29, 2016

(65) Prior Publication Data

US 2018/0188738 A1 Jul. 5, 2018

(51) Int. Cl.
*G05D 1/02* (2006.01)

(52) U.S. Cl.
CPC ......... *G05D 1/0246* (2013.01); *G05D 1/0234* (2013.01); *G05D 1/0276* (2013.01); *G05D 2201/0213* (2013.01)

(58) Field of Classification Search
None
See application file for complete search history.

(56) References Cited

U.S. PATENT DOCUMENTS

| 5,943,428 A * | 8/1999 | Seri | G01H 3/12 |
| | | | 381/56 |
| 2016/0217333 A1* | 7/2016 | Ozawa | G08G 1/164 |

FOREIGN PATENT DOCUMENTS

| KR | 1020140048539 A | 4/2014 |
| KR | 101526343 B1 | 6/2015 |
| KR | 101688218 B1 | 12/2016 |
| WO | WO-2009115918 A1 | 9/2009 |

OTHER PUBLICATIONS

"Background Subtraction for Detection of Moving Objects", [Online]. Retrieved from the Internet: <URL: https://computation.llnl.gov/casc/sapphire/background/background.html>, (Last Modified: Aug. 8, 2005), 3 pgs.

(Continued)

*Primary Examiner* — Mussa A Shaawat
*Assistant Examiner* — Michael V Kerrigan
(74) *Attorney, Agent, or Firm* — Schwegman Lundberg & Woessner, P.A.

(57) ABSTRACT

In some embodiments, the disclosed subject matter involves a system and method for dynamic object identification and environmental changes for use with autonomous vehicles. For efficient detection of changes for autonomous, or partially autonomous vehicles, embodiments may use a technique based on background removal and image subtraction which use motion detection rather than full object identification for all objects in an image. Road side units proximate to a road segment or virtual road side units in the cloud, other vehicles or mobile device (e.g., drones) are used to retrieve and store background images for a road segment, to be used by the autonomous vehicle. Other embodiments are described and claimed.

25 Claims, 5 Drawing Sheets

(56) References Cited

OTHER PUBLICATIONS

Singla, Nishu, "Motion Detection Based on Frame Difference Method", International Journal of Information & Computation Technology, 4(15), (2014), 1559-1565.
"International Application Serial No. PCT/US2017/063630, International Search Report dated Mar. 15, 2018", 3 pgs.
"International Application Serial No. PCT/US2017/063630, Written Opinion dated Mar. 15, 2018", 13 pgs.

* cited by examiner

DETECTION OF TRAFFIC DYNAMICS AND ROAD CHANGES IN AUTONOMOUS DRIVING

TECHNICAL FIELD

An embodiment of the present subject matter relates generally to autonomous vehicles and, more specifically, to identifying changes in the environment and road that enable dynamic analysis of the driving environment.

BACKGROUND

Various mechanisms exist for visual identification of roads and objects for use with autonomous vehicles. Road identification usually involves extensive mapping of the areas in which the autonomous vehicle is to travel using cameras or Lidar (Light Detection and Ranging) for creating high-definition maps. Highly Automated Vehicles (HAVs) developed now rely on detailed high-resolution maps. Changes in the environment between the time of mapping and the time of driving can cause identification errors, for instance when potholes appear or there is construction on the road. It is also unrealistic to expect to have precision maps for the entire planet. Relying on crowd-sourced updates have also failed in cases when neighborhoods purposely report inaccurate information to drive traffic away from their area.

Existing vehicular computer vision systems rely on machine learning algorithms such as convolutional neural networks (CNN) or deep neural networks (DNN) to analyze a scene and extract objects from the video frames. Additionally Radar (Radio Detection And Ranging) or Lidar are used and data from them is fused with the data extracted from images. Lidar may be prohibitively expensive for some implementations while Neural Networks may produce incorrect results or be spoofed by attackers. Machine Learning algorithms are very processing and memory demanding and adding data fusion increases rudiments for compute power presenting significant obstacles in creating autonomous or self-driving vehicles.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

An embodiment of the present subject matter is a system and method relating dynamic object identification and environmental changes for use with autonomous vehicles. For efficient detection of changes for autonomous vehicles, embodiments may use a technique based on background removal and image subtraction. Presently, computer vision is not able to detect changes on the road such as potholes and existing techniques may struggle with the efficiency of recognizing moving objects, where current algorithms create bounding boxes around these objects. For example, it is challenging for modern algorithms to distinguish a plastic bag from a rock; it is also challenging to distinguish a stationary person at an intersection from someone who is just about to cross.

Techniques described herein differ from traditional object detection for used by autonomous vehicles by instead providing motion detection using minimum processing and compute power. Specialized hardware and software architecture may be used to detect motion and obstacles without trying to recognize the objects that move or are in the way of a moving vehicle. To accomplish this, embodiments may detect displacement in images from vehicle cameras. In an embodiment, for detecting displacement a baseline background image, or template may be compared to images captured with the vehicle's camera. A road side units (RSU) may be used to provide the background template. In lieu of RSUs on the road, a template may be retrieved from the cloud, a drone, satellite communication, vehicle to vehicle communication, or be generated by the vehicle itself, by a background image template generator. An efficient system and solution is to provide two poles, or RSUs, with radio frequency (RF) capabilities. The RSUs may use any number of RF protocols or frequencies, for instance, 4G, 5G, dedicated short-range communications (DSRC), etc. Infrared or other line of sight visual communication methods may be used. The RSUs may be able to record information for a road segment and coordinate traffic flow and foreign object recognition based on simple image processing techniques.

The background image template may be a prepared view of the scene from the point at which a vehicle is presently located, without any foreign objects. Prepared views of the scene may be stored in RSUs or in the cloud and used by other vehicles to optimize computation.

In an embodiment, a system uses vehicle cameras to record the road and store the information in road side units (RSU) and be uploaded to the cloud for processing together with its GPS coordinates and road beacons (sensor data as part of the video frames). Time of day and weather conditions may also be recorded to ensure that changing landscape is correctly used. GPS coordinates and road position ensure correct world view angle for image subtraction. Additionally, grid overlay for distance and motion calculation may be used.

In an embodiment, two RSUs may be used: one at the beginning of a road segment, and another one at the end of the road segment. In this way, virtually any paved or unpaved road in any location in the world may be easily covered. Thus, there is no need for a massive infrastructure in implementation.

In an embodiment, the system relies on background image removal and overlaying of subtracted video frames with gridlines for distance and motion detection. Sensor data from the RSU, GPS, and additional metadata (time, weather, etc.) are embedded into the image frames to improve precision and reliability of the system. Only objects that changed their location or moved within the frames remain visible. In this case, additional DNN or CNN based image recognition may be activated, and radar or Lidar may be used as a complimentary solution, if they are available.

Figure 1A:
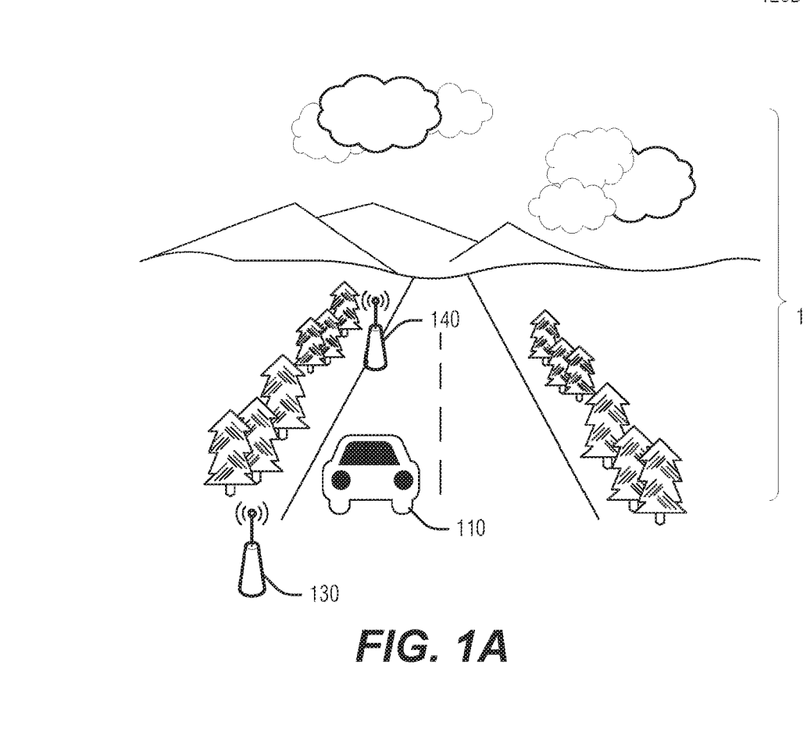
FIG. 1A is a diagram illustrating an example image frame as seen from an autonomous vehicle, according to an embodiment.
Figure 1B:
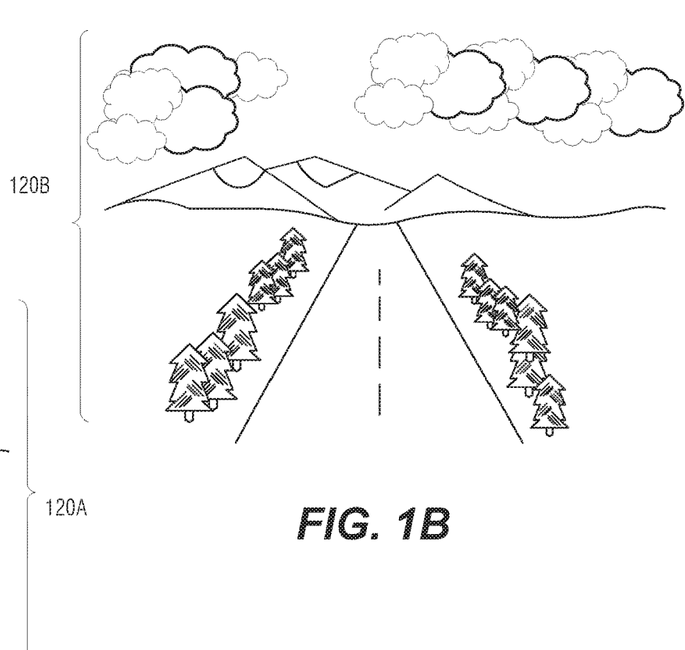
FIG. 1B is a diagram illustrating an example background image frame after foreground (moving) objects have been removed, according to an embodiment.

Referring to FIG. 1A there is shown a representation of an example image with background and foreground information. Background image 120A includes clouds, trees, a road, mountains in the distance, etc. In this example, an automobile 110 is shown in the foreground. Since the automobile 110 is mobile, it is not likely to appear in the template image, as shown in FIG. 1B. FIG. 1B illustrates a background image frame, also referred to as a template image, or background template image, of the environment with only the background image data 120A, i.e., no automobile 110 in the foreground. Background image frame 120B may be slightly different than the image 120A in FIG. 1A due to passage of time, changing seasons, flora growth, environmental decay (e.g., potholes in road), etc.

FIG. 1A also shows a representation of a start RSU 130 and end RSU 140 for the segment of road shown. RSU 130 may be referred to as a "begin RSU" and RSU 140 may be referred to as an "end RSU" consistent with the vehicle's direction of travel. It will be understood that the begin and end RSU designation may be reversed for vehicles traveling in the opposite direction. In this example, the autonomous car (not shown) is traveling in the direction from bottom of the page to top of the page.

If an RSU is broken or unavailable, the vehicle's on-board computers may use its own video frames to remove the background, where the first frame serves as a template, and following several frames are aligned to remove the background. In such a scenario when the RSU is missing or broken, multiple cars with various types of sensors may perform the same activity to analyze the surrounding area around the missing/broken RSU. In an embodiment, the vehicles will tag the images and send their findings to the cloud. In the cloud, a similarity analysis is performed. The DNN-based scoring results and final findings may vary from vehicle to vehicle, depending on the sensor quality and/or visual chip processing capabilities. Once the similarity analysis achieves high precision, for instance 99.9%, a 'virtual RSU' may be created in the cloud to act as a virtual instance of the missing/broken RSU, until the unit is repaired or replaced. In some environments, many or all of the RSUs will be virtual due to lack of cost effectiveness or feasibility of placing physical RSUs. Over time, virtual RSU nodes in the cloud may be used for improving the observation precision received from older or outdated RSUs in the road.

In an embodiment, start and end RSUs 130, 140 may respectively stream template video frames into the vehicles that enter the road segment and receive stream from the vehicles that exit it. These RSUs 130, 140 are all that is needed to coordinate traffic flow on this road which might be a rural road. This solution is advantageous over existing solutions which first require high-resolution map creation of a road, before a car is able to self-drive on the road. In existing systems, even with fairly accurate maps, the maps and cars cannot easily adjust to changing road conditions.

Figure 2:
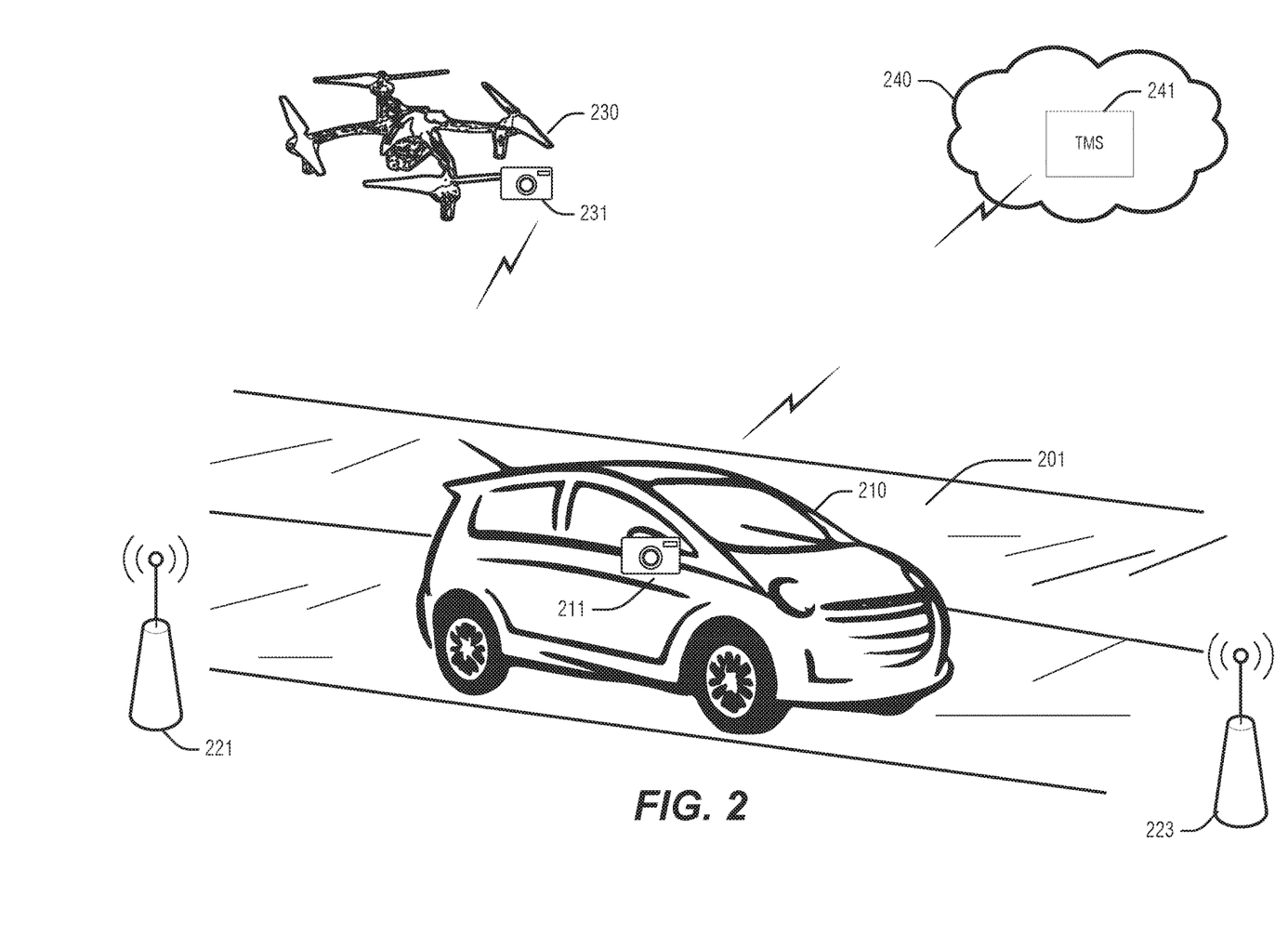
FIG. 2 is a block diagram illustrating the system for using road side units (RSUs) to aid autonomous vehicles, according to an embodiment.

FIG. 2 is a block diagram illustrating the system for using road side units (RSUs) to aid autonomous vehicles, according to an embodiment. Referring to FIG. 2, there is shown an illustration of the communication among system devices and components, according to an embodiment. A vehicle 210 on a road 201 enters a road segment. In an example, the road segment is bounded by RSU 221 and RSU 223. In this example, the vehicle 210 is traveling from left to right, so RSU 221 is conceptually the start RSU and RSU 223 is the end RSU. The vehicle 210 also includes an image collection system, such as camera 211, to capture images of the road 201 and environment. For simplicity, the term camera may be used synonymously with the term image collection system, in this document. In an embodiment, the image collection system may include a camera, camera assembly, and on-board processor, etc. In an embodiment, the image collection system may include the camera and optionally the other assembly and processing, or compute device, components. An on-board processor, or compute device (not shown), may also be referred to as an image forwarding device. The image forwarding device may receive images from the camera 211 and forward them to a server on the cloud 240. In an embodiment, the image forwarding device may be part of the camera assembly. In another embodiment, the image forwarding device may be a separate compute device on the vehicle 210 which is communicatively coupled to the camera 211. The camera and image forwarding device may be hardwired together or communicate wirelessly via a variety of formats. The image forwarding device may include a communication link or component, or may be coupled to a transmitter or transceiver to send/forward images to the cloud 240, drone 230, or other vehicles (not shown).

The vehicle on-board processor communicates with available RSUs 221, 223, when in range. The on-board processor may communicate to the cloud 240 or a drone 230 in alternative embodiments. When the RSUs 221, 223 are not available, either due to damage, or in remote areas where it is too costly or inconvenient to place an RSU, the on-board processor may communicate with the cloud 240 to upload images and download background templates. In another embodiment, when RSUs 221, 223 are damaged or unavailable, a drone 230 may be sent to the area of road segment, in advance, to capture images for templates. The drone 230 includes a camera 231 and its own on-board processor (not shown). As with the vehicle 210, the drone's on-board processor may be part of the camera assembly or be a separate component. The drone 230 may communicate captured templates to the cloud 240 or directly to the vehicle 210.

Figure 1C:
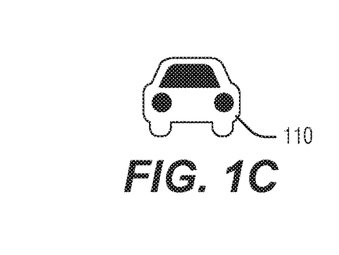
FIG. 1C is a diagram illustrating the foreground objects that were removed from FIG. 1B.

In the illustrated example, as the vehicle 210 enters a road segment, image frames are fed into the vehicle from the start RSU 221 for masking the background. For example, the vehicle camera 211 sees the following road ahead, as illustrated in FIG. 1A. This image may be converted to grayscale and further pre-processed. A template image from the RSU 221 may be provided, as illustrated in FIG. 1A. The template may be used to produce a mask resulting in removal of the background and only a foreign object or changes in the road remain for the ideal video frames. In this example, clouds are different, and the season may be different as indicated by snow caps on the mountain tops in the template (FIG. 1B). Standard algorithms such as, but not limited to, frame differencing, approximate median, median determination, Kalman filtering, mixtures of Gaussian algorithms, etc., may be used to account for these differences. In this example, when then background is masked out of the image in FIG. 1A, all that will remain is the on-coming vehicle 110, as in FIG. 1C.

In an embodiment, noise from wind, snow or rain and other artifacts may be removed to ensure close matching between the camera image and the mask. Near infrared (IR) images may be used to help compare frames that have seasonal or environmental differences like snow, or rain. Ignoring the environmental differences allows easier identification of motion or boundaries. Most cameras already collect near IR frequencies, but filter them out for human vision. HDR (one floating point channel) may also help distinguish when there are varying lighting conditions.

Existing systems using computer vision may use edge detection algorithms that detect shadows while attempting to identify objects or movement. A shadow is perceived as a contour. To distinguish the object, Lidar or Radar is used to identify the shapes. These systems may be very expensive. There is some work being done to use 3D cameras to better identify objects. But existing system have difficulty detecting objects in all conditions. Even if the system is able to distinguish the edges of the object from the shadows, existing systems have difficulty distinguishing a plastic garbage bag on the road, from a solid rock. Human vision can distinguish more easily because humans use hints in object behavior to help identify it. For instance, vibrations, indicating movement in the wind will sway a person to believe the object is a bag more than a rock.

In existing systems, some object recognition tasks are performed by DNN/CNN and trained offline with millions of images. Once the training is complete, the recognition system is installed in a vehicle. Thus, (typically) no more learning is possible.

In an embodiment, full attempts at object recognition, as in existing systems, is replaced by motion detection and characterization of a foreground object. Additional physical parameters that characterize behavior of the moving bodies may be calculated by the vehicle's on-board computer. For example, if a plastic bag is moving with the wind on the road, its velocity and weight may be computed and compared with the internal database of absolute motion parameters for objects and their properties, to ensure safe driving. That is, a plastic bag will move at speeds at which heavy objects cannot move. Knowing the range and trajectory of motion gives an algorithm an idea of weight and hardness of an object. In most cases, it is less dangerous to run over a plastic bag than to run over a rock of similar dimensions. Being able to distinguish between the two objects will avoid undue swerving or breaking in the autonomous vehicle so as to needlessly avoid the harmless object.

The template images may be generated and provided to the vehicle in varying manners, based on different embodiments. Generally, the templates need to have the same world view as the vehicle's image capture system, e.g., same perspective and height. Template images may be captured by hovering drones, road side cameras communicatively couple to one or more RSUs, dedicated mobile image capture systems, previous vehicular traffic cameras, etc. In an embodiment, where an RSU is down for maintenance, and virtual RSU is not available, or the vehicle does not have bandwidth coverage to access the cloud, the vehicle may use its own frames as template frames. In this case, the calculation may be more complex because an initial background image is not available. Use techniques similar to compressing video streams over networks. Compare N−1 and N frames in video frames. Easily detect background image by removing portions of the frame that change over time, as moving objects. In an embodiment, the first template image to be provided by the RSU may be generated in this manner, because no first background image may exist. The determination of which image to provide as a background template image may be automatic. A simple rule-cased algorithm or CASE statement may be used to cycle through availability options, with the local generation of the image being the final resort. In this case, the locally generated background image may then be uploaded to the RSU, or virtual RSU as the baseline image to be used by other vehicles passing through the road segment.

In an embodiment, near IR frequency images may be used to quickly detect motion and identify the background. In an embodiment, color images may also collected to pass through to a secondary algorithm to be used as a double check mechanism. Once the background template image is generated, it will be stored or uploaded to an RSU on the ground or virtual RSU in the cloud. A variety of communication methods may be used by the vehicle. For instance, LTE or 5G, or any other type of telecommunication protocol, and/or radio waves, and/or WiFi, or even line of sight visual protocols may be used to communicate to the cloud. In an embodiment, when no usual cellular or broadband connection is available, for instance in rural areas, a drone may be deployed to act as a relay or access point. The drone may have a satellite broadband communication connection to immediately forward the information to the cloud, or store the data locally until it can enter an area with broadband communication access, and then transmit. The vehicle may communicate with an RSU on the ground using a variety of communication methods and protocols, for instance, cellular, point to point WiFi, Bluetooth, etc.

As the vehicle 210 exits the road segment at RSU 223, it uploads its view of the road 201 to the end RSU 223. Start and end RSUs 221, 223 may post-process the image data and mark the changes in the road or weather conditions and submit processed data to a traffic management system 241 (TMS) in cloud 240. It should be noted that vehicles may take images from many directions, thus benefiting other vehicles' data regardless of driving direction. It will be understood that both manned and unmanned (autonomous) vehicles traveling on the road segment may send image data to RSUs and the cloud. A manned vehicle may not be able to utilize the images directly, but by sending them to the traffic management system 241, a more accurate model of the local environment may be made available to the autonomous vehicles, and for navigational and traffic or accident reporting systems.

Template image frames from the RSU may be aligned with the image frames from the vehicle cameras as the vehicle is moving on the road segment based on GPS coordinates and inertial correction data for more precise selection of the frames.

In an embodiment, the start RSU and end RSU are in line of sight and can communicate easily. In another embodiment, the start and end RSUs communicate through a virtual RSU in the cloud.

RSUs may be deployed as a safety means for the autonomously operating fleets. In an embodiment the RSU may collect data about a selected type of the fleet, for example, platooning trucks and the operations of the trucks while merging into the traffic and/or reacting to the emerging traffic. Whenever the RSUs discover that there is a discrepancy on one of the trucks (for example, the truck's trunk unlocked itself, the door opened and some items fell out or stick out) an appropriate warning may be sent to the truck control system and/or to the cloud.

The RSUs may also be used to collect data on the trucks operations depending on the road conditions, for example, on one road (e.g., well-conditioned and broad road) the truck platooning algorithm works efficiently, while on another road (e.g., full of potholes, tight road) the platooning algorithm may be optimized and adjusted accordingly. The RSU may help in assessing the various scenarios based on the environment and deploy the DNN and CNN networks to train the algorithms for more efficient and situation-aware platooning, in particular, when the trucks make a turn.

Similarly, when an emergency vehicle is on the road (e.g., medical emergency vehicle, fire emergency vehicle), specific conditions are expected by other cars to be created for them. Medical vehicles may be provided priority. This priority may be based on the information provided by the RSUs. For example, the start RSU and the end RSU for a dedicated road segment may inform the passenger vehicles present on this same road segment how to create efficient space for the medical vehicle(s), e.g., when and where to pull to the side, or speed up or slow down, etc. In addition, real-time optimization of the incoming medical emergency vehicle requests may be performed on the processor onboard an RSU 221, 223 and/or in the cloud 240.

Figure 3:
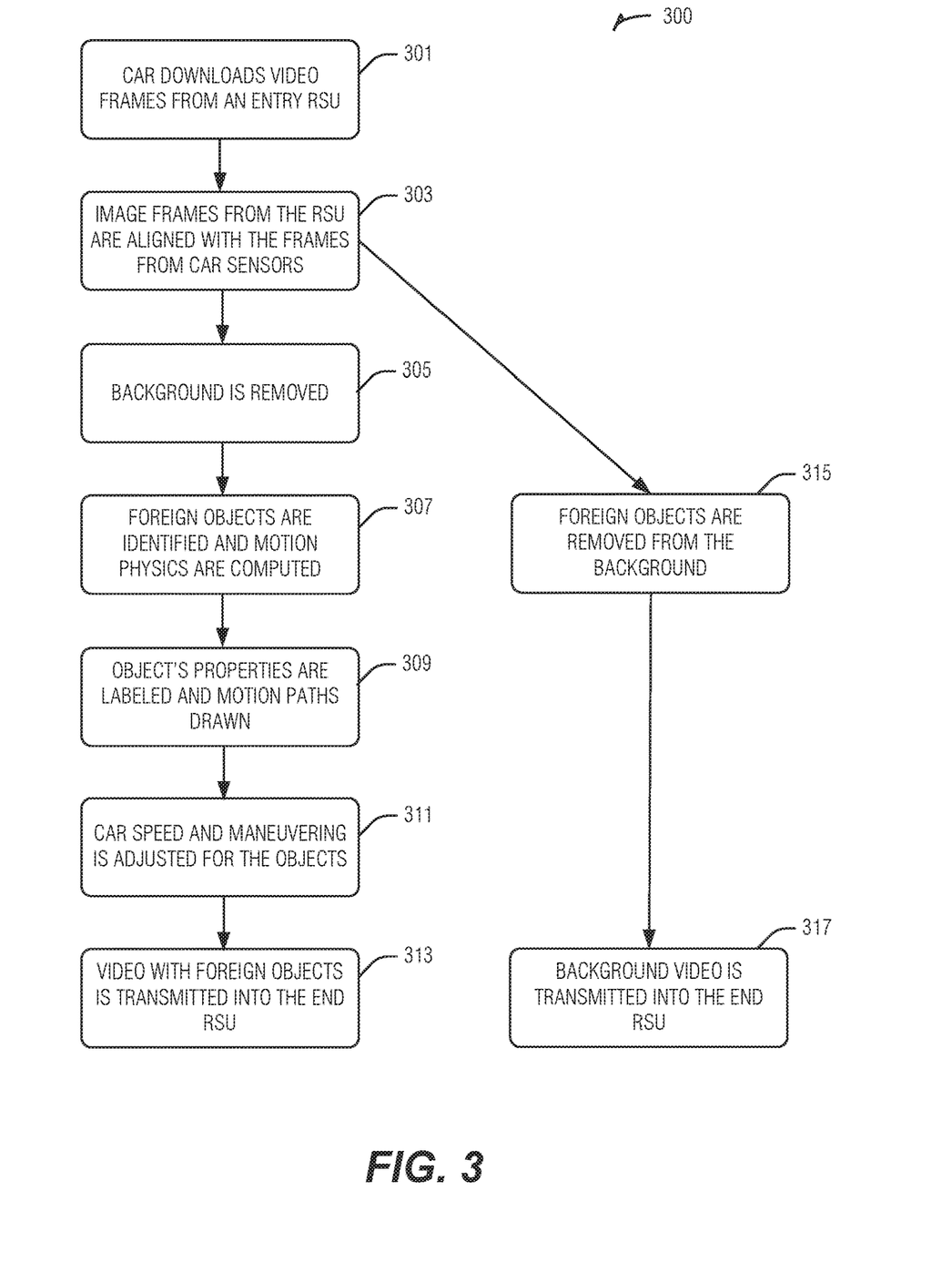
FIG. 3 is a flow diagram illustrating a method for using RSUs to aid traffic management, according to an embodiment.

FIG. 3 is a flow diagram illustrating a method 300 for using RSUs to aid traffic management, according to an embodiment. An embodiment may identify foreground objects in the environment. An autonomous, or partially autonomous vehicle enters a road segment at the start location. If a physical start RSU is available, the vehicle downloads video frames from the RSU to use as a template, in block 301. If the RSU is not available, the vehicle may either download the frames from a virtual RSU in the cloud, satellite, or cell tower, or capture video and use the vehicles own video frames as a baseline template. In an alternate embodiment, the vehicle may send up a drone, or request drone assistance, either in advance, or just prior to entering the road segment. The drone may capture video of the road segment to generate baseline template frames. In an embodiment, the drone sends the template frames to a virtual RSU in the cloud. In another embodiment, the drone sends the frames directly to the vehicle and acts as the virtual RSU. If the drone is unable to fly low enough to get the correct perspective, as would be seen from the vehicle, transposition or translation of the images may be performed by a processor on the drone, or in the cloud, to format the images for better image subtraction.

Once the vehicle obtains the template, or image, frames from the RSU (or virtual RSU), are aligned with frames captured by the vehicle's camera system, in block 303. Alignment may be assisted by matching frames at the same GPS location. Alignment may use landmarks in the image. In an embodiment, markers in the scenery may be helpful to orient and match different images from different sources. A drone may carry paint to add as a marker to the scenery. The drone may re-apply the paint if the algorithm exhibits problems aligning the images from the different vehicles. There are a number of techniques that may be used to match the frames, for instance, picture stitching algorithms. The images are compared and subtracted to remove the background in block 305. Removal of the background should reveal mobile objects, potholes, items or debris on the road, etc. As the vehicle moves through the road segment, three dimensional (3D) objects may be identified as moving objects because the foreground objects move relative to the vehicle. Moving objects may be quickly identified by comparing adjacent or proximate frames. Moving objects may be identified or characterized by comparing their characteristics with known features in a database. Motion physics are computed for identified foreground objects. Movement of an object, as well as its shape are analyzed in block 307 to identify the foreground objects, and their movement vectors, if applicable. Actual identification of the object is not necessary. Analysis to determine whether the object poses a hazard may be performed more quickly when actual object identification is circumvented. Movement of a plastic bag on the road, and perhaps its floating movement, may be distinguished from a stationary rock. Identification of whether the object is solid or floating, based on its motion vectors, assists the autonomous vehicle in determining whether to avoid the object or drive through it. But it is not as important to identify the object as an actual rock or plastic bag.

Object properties are labeled and motion paths drawn to predict where the object will be when the vehicle approaches, in block 309. The vehicle speed and any required maneuvering may be adjusted to account for the foreground objects by a vehicle maneuvering controller, in block 311. Maneuvering algorithms may rely on known properties for specific objects. Rocks may require avoidance, and plastic bags driven through. A large garbage bag with items inside, however, will be identified as an object to avoid, rather than plowed over. The movement of a bag with heavy objects will not be the same as a harmless, empty bag moving with the wind, for instance.

The video images with the foreign objects may be transmitted to the end RSU for further processing or transmitted to a traffic management system in the cloud, satellite, etc., in block 313. Foreign objects (foreground) may be removed from the background in block 315. The background images may be uploaded to the end RSU, in block 317, to assist with providing future image templates. The background images may also be transmitted to a virtual end RSU in the cloud. In an embodiment, the start and end RSUs may directly communicate with one another to propagate the background and foreground images. In another embodiment, the RSUs may communicate to one another via transmission to the cloud. And in some cases, a road segment may have one physical RSU and one virtual RSU as start and end RSUs. Both RSU's, whether physical or virtual, are responsible for the processing of the conditions for the road segment and synchronizing frames between and among each other and the cloud.

An embodiment identifies moving or foreign objects and their physical properties such as motion and weight. Other flows, such as, algorithms for interpreting data from Radars or specifically trained to detect road boundaries may be implemented using other techniques such as DNN/CNN. Data from several flows may be merged for deciding vehicle speed and direction.

Referring again to FIG. 2, in an embodiment, the camera 211 on the vehicle 210 has an on-board processor, and may be coupled to a database that contains motion properties such as velocity and jitteriness. It should be noted that object identification may include identifying that an object is present, and correlating its physical and motion characteristics, without attempting to identify the actual object type. The database may contain parameters for objects that identify whether it should be avoided, or is harmless. Object detection and motion analysis may be performed in the camera assembly. However, this implementation may cause the cameras to be very expensive. In another embodiment, the camera has minimal compute power and object detection and motion analysis is performed in the cloud. In this embodiment, the camera can be installed cheaply, and replaced easily if there is breakage or failure. In another embodiment, the camera communicates with an ECU (electronic control unit) to perform the processing. The ECU may reside on the vehicle, but is a separate unit or component from the camera. Thus, the camera can still be replaced fairly cheaply, if damaged.

Figure 4:
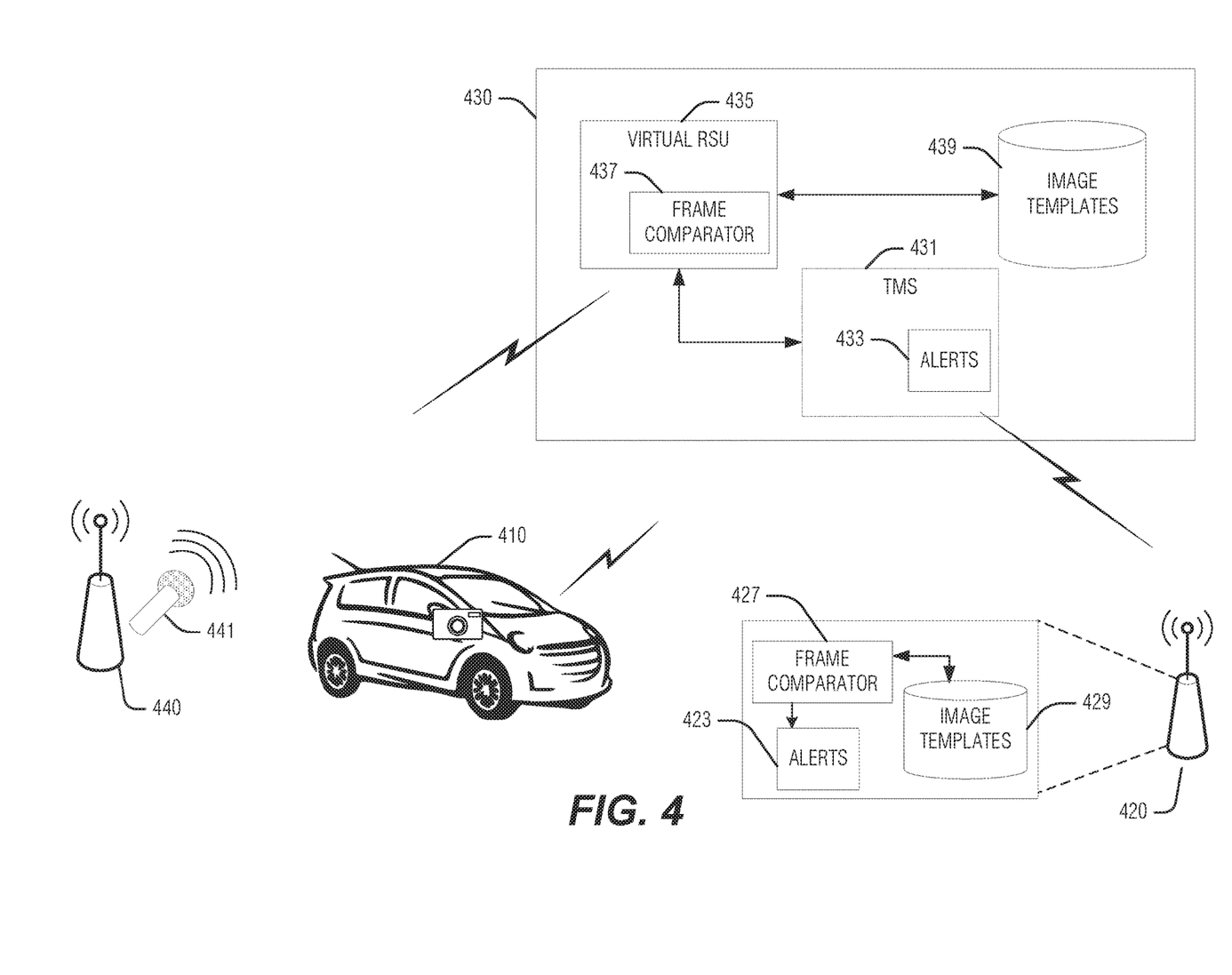
FIG. 4 is s a block diagram illustrating various components of the RSUs, according to an embodiment.

FIG. 4 is a block diagram illustrating various embodiments for RSUs and virtual RSUs. Autonomous vehicle 410 may communicate with a physical RSU 420 or virtual RSU 435 in the cloud. The virtual RSU 435 and traffic management system (TMS) 431 are shown as residing on a server 430 in the cloud. However, it will be understood that the virtual RSU 435 and TMS 431 may reside on separate, but communicatively coupled, nodes or servers. In an embodiment, the RSU 420, 435 is coupled to an image template database 429, 439 to hold the background image frames. The image template database 429, 439 may receive the background image baseline template from a vehicle, drone, or other source. In an embodiment, the RSU 420, 435 is coupled to a frame comparator component 427, 437 to generate a background image template from a plurality of image frames of the environment. The frame comparator 427, 437 may be coupled to a background image template generator to compare collected images and remove foreground objects to generated a template background image. In an embodiment, the background image template generator may be included in the same component as the frame comparator. In an embodiment, the background image template generator may reside on the vehicle so that a background image template may be generated even when RSUs are unavailable to the vehicle. Once generated, the background image is stored in the image template database 429, 439 for later transmission to the vehicle 410. The RSU may dynamically update the background images as it receives new image frames. In an embodiment, the background image may be fixed until explicitly updated.

In an embodiment, the baseline background image stored in the database 429, 439 may be expired after a predetermined amount of time. Aging seasonal baselines to may be useful when the environment changes significantly, but temporarily, for instance due to snow or lighting. Mountainous areas may have background templates that vary by season, for quicker analysis. An aged baseline template may be made active again by a simple change in parameters over time. The RSU 420, 435 may automatically reinstate a baseline template based on season, lighting, temperature, etc. Multiple baselines may be present in the database 429, 439 at the same time. The RSU 420, 435 may choose which template to make active based on independent seasonal or weather knowledge, for instance when temperature, clock or other sensors are available. In another embodiment, the active background template may be selected based on output from the frame comparator 427, 437.

A traffic management system (TMS) 431 may have an alert component 433 to broadcast alerts when obstacles or road hazards are identified. The alerts may be broadcast directly to the vehicle 410 or via an alert component 423 on the ground RSU 420. In an embodiment, the RSU 420 may identify the obstacles and alert the vehicle 410 and broadcast to a second RSU 440 for rebroadcast.

In an embodiment, additional sensors, for instance a microphone, or other audio signal capture device 441, may be used to identify movement, steps, animal or herd noise, etc. In an embodiment, the audio component (not shown) coupled to the microphone 441 may be trained to identify avalanche onset, boulders calving from a cliff, or fauna migration, etc. In an embodiment, the audio component may reside on the RSU 440 or in the cloud. The audio component will be coupled to a database holding audio samples for use in comparison, to identify target sounds, e.g., the aforementioned avalanche onset, boulders calving from a cliff, fauna migration, or vehicle crash sounds like breaking glass, sirens, etc. Audio signals may be recorded with a timestamp to ensure that any alerts sent are still relevant. An alert based on audio detection of a potential hazard may be stored for continuous broadcast; periodic broadcast; later broadcast; or direct transmission to a vehicle, other RSU, or virtual RSU, based on the characteristics of the hazard. If these audio signals are triggered, the visual system may be put on high alert for animals crossing the road, or boulders blocking the way. The RSU may process this information and send an alert directly to a vehicle and/or transmit a warning to the TMS 431 in the cloud. The TMS 431 may alert vehicles to potential hazards well before they enter the road segment with the movement. The alert may cause the vehicle to enter the area at a slower velocity.

In another embodiment, RSUs may not be available, but the road segment may have high traffic volume. In this case, the vehicles may use a vehicle-to-vehicle communication to pass template images back and forth for the use of other vehicles. In this scenario, a vehicle may act as a mobile, virtual RSU.

In an embodiment, emergency vehicles may broadcast a warning to the TMS 431 which may alert cars as they enter or exit a road segment. In another embodiment, the emergency vehicles may also communicate to other vehicles with vehicle to vehicle communication. However, in some terrains, this kind of communication may require line of sight. Therefore, an additional alert from the TMS may provide an earlier warning.

As the system is dynamic, images are always updated to note permanent changes to the infrastructure such as expansion of lanes, or fixes to existing potholes.

Figure 5:
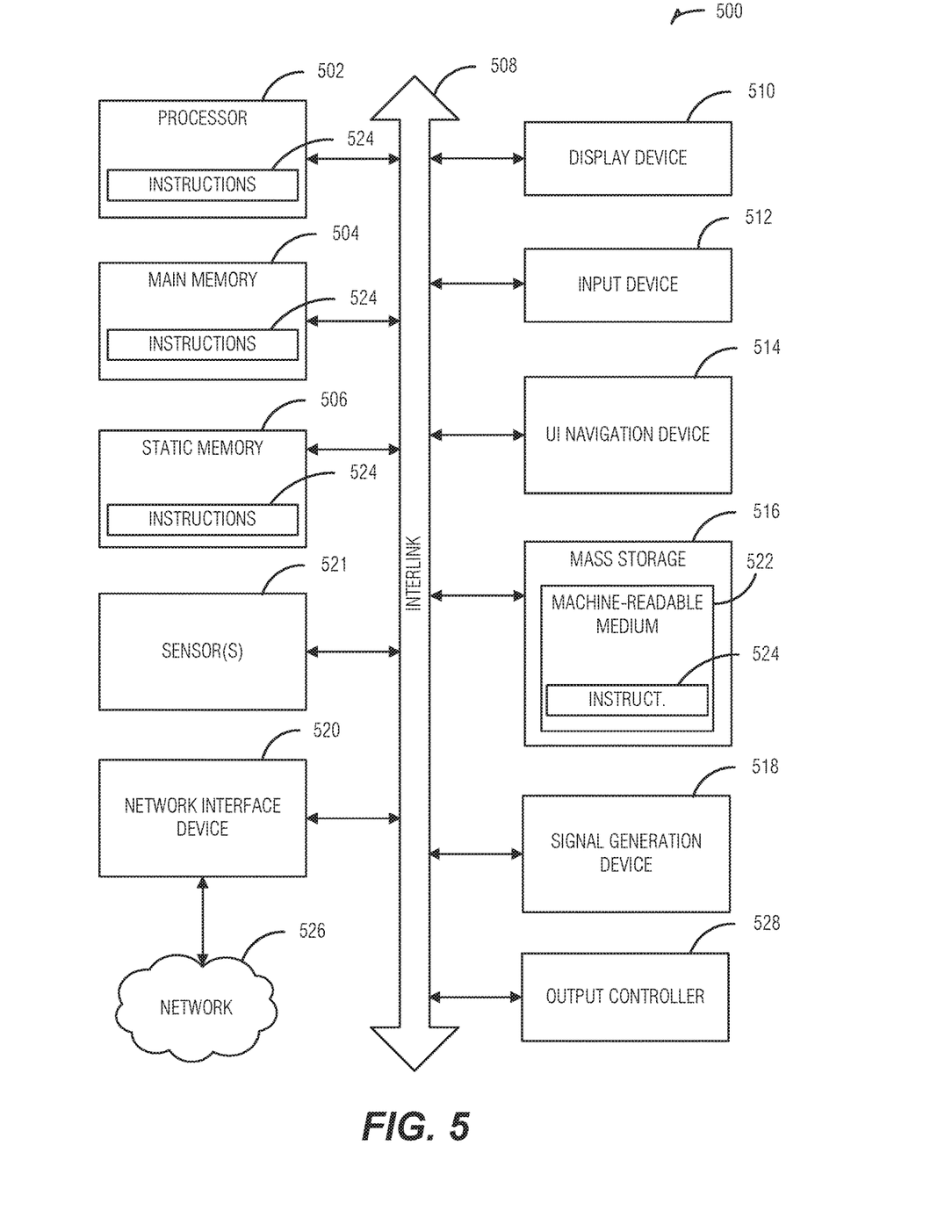
FIG. 5 is a block diagram illustrating an example of a machine upon which one or more embodiments may be implemented.

FIG. 5 is a block diagram illustrating an example of a machine, or compute device 500, upon which one or more embodiments may be implemented. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

Examples can include subject matter such as a method, means for performing acts of the method, at least one machine-readable medium including instructions that, when performed by a machine cause the machine to performs acts of the method, or of an apparatus or system for detection and management of traffic dynamics for autonomous and partially autonomous vehicles, according to embodiments and examples described herein.

Example 1 is a system for detection and avoidance of road hazards, comprising: an image frame comparator to receive a background image template and to compare the background image template to at least one of a plurality of collected image frames, and further to separate foreground images and background images from the collected image frames, wherein the background image template is received from a road side unit, wherein the background image template corresponds to a road segment on which a vehicle is to travel; and a vehicle maneuvering controller on the vehicle to analyze the foreground images to identify hazards on a road, for avoidance.

In Example 2, the subject matter of Example 1 optionally includes an image collection system that when in operation is communicatively coupled to a vehicle, the image collection system including a camera and arranged to collect the plurality of image frames.

In Example 3, the subject matter of any one or more of Examples 1-2 optionally include wherein the road side unit is a device selected from the group consisting of a road side unit proximate to the road segment, and a virtual road side unit that, when operating, is in communication with the vehicle and resides on one of a server coupled to a network, a proximate second vehicle, a drone or a mobile device.

In Example 4, the subject matter of any one or more of Examples 1-3 optionally include wherein the system further comprises an image forwarding device to forward at least one of a background image or a foreground image to the road side unit.

In Example 5, the subject matter of any one or more of Examples 1-4 optionally include wherein to separate foreground images and background images the image frame comparator is to align the collected frames with the background image template, and wherein the image frame comparator is further to identify motion vectors corresponding with foreground objects in the foreground images.

In Example 6, the subject matter of any one or more of Examples 1-5 optionally include wherein the background image template is received from one of a road side unit, a virtual road side unit, or a background image template generator coupled to the image frame comparator on the vehicle, wherein the background image template generator is arranged to use images collected by the image collection system to generate a new background image template.

In Example 7, the subject matter of Example 6 optionally includes wherein the background image template generator is to operate when no usable background image template is available from the road side unit or from the virtual road side unit.

In Example 8, the subject matter of any one or more of Examples 1-7 optionally include wherein the vehicle maneuvering controller is further to adjust the vehicle velocity in response to identification of the foreground objects.

In Example 9, the subject matter of any one or more of Examples 1-8 optionally include wherein the vehicle maneuvering controller is further to adjust the vehicle velocity in response to an alert received from one of the road side unit and a traffic management system on a network.

Example 10 is a road side unit for assisting with managing traffic in a road segment, comprising: an image template controller to send and receive images corresponding to the road segment; an image template database that when in operation is coupled to the image template controller for storing the images corresponding to the road segment, the images comprising background and foreground images, wherein the image template controller is to receive the images corresponding to the road segment from at least one of a vehicle traveling in the road segment, another road side unit, a virtual road side unit, a drone or other mobile image collection device; an image frame comparator to compare at least two of the image frames corresponding to the road segment, the compare to further separate foreground images and background images from an image frame using subtraction, and to remove foreground objects from the image frame to generate a background image template corresponding to the road segment, the background image template to be stored in the image template database.

In Example 11, the subject matter of Example 10 optionally includes an audio collection system to capture audio information corresponding to the road segment, and communicatively coupled to an audio database to store audio samples of target sounds; an audio analysis component to compare captured audio signals with the audio samples to identify temporal presence of a target sound; and an alert device to send a notification that the target sound is present in the road segment.

In Example 12, the subject matter of any one or more of Examples 10-11 optionally include wherein the road side unit is a device selected from the group consisting of a road side unit proximate to the road segment, and a virtual road side unit that, when operating, is in communication with a vehicle and resides on one of a server coupled to a network, a proximate second vehicle, a drone or a mobile device.

In Example 13, the subject matter of Example 12 optionally includes wherein, when in operation, the road side unit communicates with at least one other road side unit to coordinate background image templates.

In Example 14, the subject matter of any one or more of Examples 10-13 optionally include an alert device to identify a road hazard object from the separated foreground images and to send a notification that a road hazard object has been identified.

In Example 15, the subject matter of Example 14 optionally includes wherein the notification is to be sent to at least one of a vehicle traveling in the road segment, another road side unit, a virtual road side unit, a drone or other mobile image collection device.

Example 16 is a computer implemented method for detecting objects on a road segment, comprising: receiving, an image frame corresponding to a road segment, the image frame having been captured by a camera assembly communicatively coupled to a vehicle; receiving, by a compute device on the vehicle, a background image frame; aligning the background image frame and the captured image frame corresponding to a road segment; separating a background portion and a foreground portion of the captured image frame, wherein the foreground portion includes moving and temporary objects in the captured image, and the background portion includes stable or generally unchanging objects in the captured image; identifying motion vectors for an object in the foreground portion and assigning properties to the object; providing information about the foreground portion including the assigned properties of the object, to a maneuvering controller in the vehicle to assist with determining whether the vehicle is to adjust a maneuver based on the received information.

In Example 17, the subject matter of Example 16 optionally includes transmitting the background portion of the captured image frame to a road side unit device.

In Example 18, the subject matter of any one or more of Examples 16-17 optionally include wherein the background image frame is received from at least one of a road side unit proximate to the road segment, and a virtual road side unit that, when operating, is in communication with the vehicle and resides on one of a server coupled to a network, a proximate second vehicle, or a drone or other mobile device.

In Example 19, the subject matter of any one or more of Examples 16-18 optionally include wherein the receiving the background image frame further comprises: retrieving at least two captured image frames from a data store on the vehicle; generating a local background image frame from a comparison of the at least two captured image frames; and using the local background image frame as the background image frame when the background image frame is unavailable from a source other than components on the vehicle.

In Example 20, the subject matter of Example 19 optionally includes transmitting the background portion of the captured image frame to a road side unit device, wherein the background portion uses the local background image frame as a template.

Example 21 is at least one computer readable storage medium having instructions stored thereon, the instructions when executed on a processor cause the processor to: receive a plurality of image frames corresponding to a road segment; receive a background image frame; align the background image frame and a captured image frame of the plurality of image frames corresponding to a road segment; separate a background portion and a foreground portion of the captured image frame, wherein the foreground portion includes moving and temporary objects in the captured image, and the background portion includes stable or generally unchanging objects in the captured image; identify motion vectors for an object in the foreground portion and assigning properties to the object; receive information about the foreground portion including the assigned properties of the object; and provide information about the foreground portion including the assigned properties of the object, to a maneuvering controller in the vehicle to assist with determining whether a vehicle is to adjust a maneuver based on the received information.

In Example 22, the subject matter of Example 21 optionally includes instructions to transmit the background portion of the captured image frame to a road side unit device.

In Example 23, the subject matter of any one or more of Examples 21-22 optionally include wherein the background image frame is received from at least one of a road side unit proximate to the road segment, and a virtual road side unit that, when operating, is in communication with the vehicle and resides on one of a server coupled to a network, a proximate second vehicle, or a drone or other mobile device.

In Example 24, the subject matter of any one or more of Examples 21-23 optionally include wherein the instructions to receive the background image frame further comprise instructions to: retrieve at least two captured image frames from a data store on the vehicle; generate a local background image frame from a comparison of the at least two captured image frames; use the local background image frame as the background image frame when the background image frame is unavailable from a source other than components on the vehicle.

In Example 25, the subject matter of Example 24 optionally includes instructions to transmit the background portion of the captured image frame to a road side unit device, wherein the background portion uses the local background image frame as a template.

Example 26 is a system for detection of traffic dynamics, comprising means for performing the method of any of Examples 16-20.

Example 27 is at least one computer readable storage medium having instructions stored thereon, the instructions when executed on a processor cause the processor to perform the method of any of Examples 16-20.

Example 28 is a system detecting traffic dynamics, comprising: means for capturing an image frame corresponding to a road segment; means for receiving a background image frame; means for aligning the background image frame and the captured image frame corresponding to a road segment; means for separating a background portion and a foreground portion of the captured image frame, wherein the foreground portion includes moving and temporary objects in the captured image, and (he background portion includes stable or generally unchanging objects in (he captured image; means for identifying motion vectors for an object in the foreground portion and assigning properties to the object; means for providing information about the foreground portion including (he assigned properties of the object, to a maneuvering controller in the vehicle to assist with determining whether the vehicle is to adjust a maneuver based on the received information.

In Example 29, the subject matter of Example 28 optionally includes means for transmitting the background portion of the captured image frame to road side unit device.

In Example 30, the subject matter of any one or more of Examples 28-29 optionally include wherein the background image frame is received from at least one of a road site unit proximate to the road segment, and a virtual road side unit that, when operating, is in communication with the vehicle and resides on one of a server coupled to a network, a proximate second vehicle, or a drone or other mobile device.

In Example 31, the subject matter of any one or more of Examples 28-30 optionally include wherein the receiving the background image frame further comprises: means for retrieving at least two captured image frames from a data store on the vehicle; means for generating a local background image frame from a comparison of the at least two captured image frames; and means for using the local background image frame as the background image frame when the background image frame is unavailable from a source other than components on the vehicle.

In Example 32, the subject matter of Example 31 optionally includes means for transmitting the background portion of the captured image frame to a road side unit device, wherein the background portion uses the local background image frame as a template.

Example 33 is a system configured to perform operations of any one or more ofExamples 1-32.

Example 34 is a method for performing operations of any one or more of Examples 1-32.

Example 35 is a at least one machine readable storage medium including instructions that, when executed by a machine cause the machine to perform the operations of any one or more of Examples 1-32.

Example 36 is a system comprising means for performing the operations of anyone or more of Examples 1-32.

The techniques described herein arc not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions arc merely a shorthand way of slating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, pecr-to-pcer or networked microserviccs. where tasks or portions thereof may be performed by remote processing devices that arc linked through a communications network.

A processor subsystem may be used to execute the instruction on the machine-readable or machine accessible media. The processor subsyslem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or wilh respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when cxccuicd by ihc underlying hardware of Ihc module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system for detection and avoidance of road hazards, comprising:
    a transceiver to:
        communicate with a cloud based database to obtain properties for objects that identify whether an object is a hazard for a vehicle in which the system is included; and
        communicate with a road side unit or the cloud based database to obtain a background image template for a road segment on which a vehicle is to travel;
    an image frame comparator to:
        compare the background image template to at least one of a plurality of collected image frames; and,
        separate foreground images and background images from the collected image frames; and
    a vehicle maneuvering controller on the vehicle to:
        analyze the foreground images to identify a hazard on the road segment using the properties for objects; and
        control the vehicle to avoid the hazard.

2. The system as recited in claim 1, further comprising an image collection system that, when in operation, is communicatively coupled to a vehicle, the image collection system including a camera and arranged to collect the plurality of collected image frames.

3. The system as recited in claim 1, wherein the road side unit is a device selected from the group consisting of a road side unit proximate to the road segment, and a virtual road side unit that, when operating, is in communication with the vehicle and resides on one of a server coupled to a network, a proximate second vehicle, a drone or a mobile device.

4. The system as recited in claim 1, wherein the system further comprises an image forwarding device to forward at least one of a background image or a foreground image to the road side unit.

5. The system as recited in claim 1, wherein to separate foreground images and background images the image frame comparator is to align the collected frames with the background image template, and wherein the image frame comparator is further to identify motion vectors corresponding with foreground objects in the foreground images.

6. The system as recited in claim 1, wherein the background image template is received from one of a road side unit, a virtual road side unit, or a background image template generator coupled to the image frame comparator on the vehicle, wherein the background image template generator is arranged to use images collected by the image collection system to generate a new background image template.

7. The system as recited in claim 6, wherein the background image template generator is to operate when no usable background image template is available from the road side unit or from the virtual road side unit.

8. The system as recited in claim 1, wherein the vehicle maneuvering controller is further to adjust the vehicle velocity in response to identification of the foreground objects.

9. The system as recited in claim 1, wherein the vehicle maneuvering controller is further to adjust the vehicle velocity in response to an alert received from one of the road side unit and a traffic management system on a network.

10. A road side unit for assisting with managing traffic in a road segment, comprising:
    an image template controller to send and receive images corresponding to the road segment from at least one of a vehicle traveling in the road segment, another road side unit, a virtual road side unit, a drone, or other mobile image collection device;
    an image template database that, when in operation, is coupled to the image template controller for storing the images corresponding to the road segment, the images comprising background and foreground images; and
    an image frame comparator to:
        compare at least two of the image frames corresponding to the road segment;
        separate foreground images and background images from an image frame using subtraction;
        remove foreground objects from the image frame to generate a background image template corresponding to the road segment;
        identify a road hazard object from the separated foreground images based on properties for objects that identify whether an object is a hazard obtained from a cloud based database; and
        store the background image template and the road hazard object in the image template database.

11. The road side unit as recited in claim 10, further comprising:
    an audio collection system to capture audio information corresponding to the road segment, and communicatively coupled to an audio database to store audio samples of target sounds;
    an audio analysis component to compare captured audio signals with the audio samples to identify temporal presence of a target sound; and
    an alert device to send a notification that the target sound is present in the road segment.

12. The road side unit as recited in claim 10, wherein the road side unit is a device selected from the group consisting of a road side unit proximate to the road segment, and a virtual road side unit that, when operating, is in communication with a vehicle and resides on one of a server coupled to a network, a proximate second vehicle, a drone or a mobile device.

13. The road side unit as recited in claim 12, wherein, when in operation, the road side unit communicates with at least one other road side unit to coordinate background image templates.

14. The road side unit as recited in claim 10, further comprising:
an alert device to send a notification that the road hazard object has been identified.

15. The road side unit as recited in claim 14, wherein the notification is to be sent to at least one of a vehicle traveling in the road segment, another road side unit, a virtual road side unit, a drone or other mobile image collection device.

16. A computer implemented method for detecting objects on a road segment, comprising:
receiving, an image frame corresponding to a road segment, the image frame having been captured by a camera assembly communicatively coupled to a vehicle;
receiving, by a compute device on the vehicle, a background image frame;
aligning the background image frame and the captured image frame corresponding to a road segment;
separating a background portion and a foreground portion of the captured image frame, wherein the foreground portion includes moving and temporary objects in the captured image, and the background portion includes stable or generally unchanging objects in the captured image;
identifying motion vectors for an object in the foreground portion and assigning properties to the object based on properties for objects obtained from a cloud based database, the properties for objects including properties that identify whether the object is a hazard and properties that characterize motion of the object;
providing information about the foreground portion including the assigned properties of the object, to a maneuvering controller in the vehicle to assist with determining whether the vehicle is to adjust a maneuver based on the received information.

17. The method as recited in claim 16, further comprising:
transmitting the background portion of the captured image frame to a road side unit device.

18. The method as recited in claim 16, wherein the background image frame is received from at least one of a road side unit proximate to the road segment, and a virtual road side unit that, when operating, is in communication with the vehicle and resides on one of a server coupled to a network, a proximate second vehicle, or a drone or other mobile device.

19. The method as recited in claim 16, wherein the receiving the background image frame further comprises:
retrieving at least two captured image frames from a data store on the vehicle;
generating a local background image frame from a comparison of the at least two captured image frames; and
using the local background image frame as the background image frame when the background image frame is unavailable from a source other than components on the vehicle.

20. The method as recited in claim 19, further comprising:
transmitting the background portion of the captured image frame to a road side unit device, wherein the background portion uses the local background image frame as a template.

21. At least one non-transitory computer readable storage medium having instructions stored thereon, the instructions when executed on a processor cause the processor to:
receive a plurality of image frames corresponding to a road segment;
receive a background image frame;
align the background image frame and a captured image frame of the plurality of image frames corresponding to a road segment;
separate a background portion and a foreground portion of the captured image frame, wherein the foreground portion includes moving and temporary objects in the captured image, and the background portion includes stable or generally unchanging objects in the captured image;
receive information about the foreground portion including the assigned properties of the object, the information received from a cloud based database, the assigned properties including properties that identify whether an object is a hazard and properties that characterize motion of the object;
identify motion vectors for an object in the foreground portion and assign properties to the object based on the information received from the cloud based database; and
provide information about the foreground portion including the motion vectors and assigned properties of the object, to a maneuvering controller in a vehicle to assist with determining whether the vehicle is to adjust a maneuver based on the received information.

22. The medium as recited in claim 21, further comprising instructions to transmit the background portion of the captured image frame to a road side unit device.

23. The medium as recited in claim 21, wherein the background image frame is received from at least one of a road side unit proximate to the road segment, and a virtual road side unit that, when operating, is in communication with the vehicle and resides on one of a server coupled to a network, a proximate second vehicle, or a drone or other mobile device.

24. The medium as recited in claim 21, wherein the instructions to receive the background image frame further comprise instructions to:
retrieve at least two captured image frames from a data store on the vehicle;
generate a local background image frame from a comparison of the at least two captured image frames;
use the local background image frame as the background image frame when the background image frame is unavailable from a source other than components on the vehicle.

25. The medium as recited in claim 24, further comprising instructions to transmit the background portion of the captured image frame to a road side unit device, wherein the background portion uses the local background image frame as a template.

* * * * *